US012236721B2

(12) United States Patent
Kato et al.

(10) Patent No.: US 12,236,721 B2
(45) Date of Patent: Feb. 25, 2025

(54) VEHICLE AND AUTONOMOUS DRIVING KIT

(71) Applicant: TOYOTA JIDOSHA KABUSHIKI KAISHA, Toyota (JP)

(72) Inventors: Yukinari Kato, Okazaki (JP); Shintaro Matsutani, Kariya (JP); Keiichi Uno, Chita-gun Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/085,922

(22) Filed: Dec. 21, 2022

(65) Prior Publication Data

US 2023/0267770 A1 Aug. 24, 2023

(30) Foreign Application Priority Data

Feb. 21, 2022 (JP) ................................ 2022-024594

(51) Int. Cl.
*G07C 5/00* (2006.01)
*G07C 5/08* (2006.01)

(52) U.S. Cl.
CPC ............. *G07C 5/006* (2013.01); *G07C 5/008* (2013.01); *G07C 5/0808* (2013.01)

(58) Field of Classification Search
CPC .......... G07C 5/00; G07C 5/006; G07C 5/008; G07C 5/0808; B60R 16/0234
USPC ........................................................ 701/29.1
See application file for complete search history.

(56) References Cited

U.S. PATENT DOCUMENTS

| | | | | |
|---|---|---|---|---|
| 7,630,834 | B2 * | 12/2009 | Klausner | G08G 1/205 701/472 |
| 10,551,838 | B2 * | 2/2020 | Liu | G01S 7/497 |
| 11,145,146 | B2 * | 10/2021 | Mercep | B60W 50/0225 |
| 2006/0020380 | A1 * | 1/2006 | Saito | B60R 16/0234 701/31.4 |
| 2018/0300008 | A1 | 10/2018 | Rasanen | |
| 2019/0300008 | A1 | 10/2019 | Ando | |
| 2020/0209002 | A1 * | 7/2020 | Hou | G06N 20/00 |
| 2021/0049444 | A1 * | 2/2021 | Bielby | G07C 5/0808 |
| 2021/0049445 | A1 * | 2/2021 | Bielby | B60C 23/0488 |
| 2021/0049480 | A1 * | 2/2021 | Kale | G05B 23/0283 |
| 2021/0049833 | A1 * | 2/2021 | Bielby | G06N 3/063 |
| 2021/0049834 | A1 * | 2/2021 | Kale | G07C 5/006 |
| 2021/0053574 | A1 * | 2/2021 | Bielby | B60R 16/0232 |

(Continued)

FOREIGN PATENT DOCUMENTS

| | | | | |
|---|---|---|---|---|
| CN | 112977300 A * | 6/2021 | | B60Q 9/00 |
| DE | 112019005425 T5 * | 7/2021 | | B60W 30/09 |

(Continued)

*Primary Examiner* — Atul Trivedi
(74) *Attorney, Agent, or Firm* — Dinsmore & Shohl LLP

(57) ABSTRACT

When a computer of an ADK determines that a condition for performing self-diagnosis processing is met, or when performance of self-diagnosis processing is notified from a VP even if the condition for performing self-diagnosis processing is not met, the computer performs processing including: a step of performing self-diagnosis processing; a step of notifying the performance of the self-diagnosis processing to the VP; and a step of transmitting a result of diagnosis obtained through the self-diagnosis processing by the ADK to a central ECU when the self-diagnosis processing is completed.

7 Claims, 9 Drawing Sheets

(56) References Cited

U.S. PATENT DOCUMENTS

| | | | | |
|---|---|---|---|---|
| 2021/0053575 A1* | 2/2021 | Bielby | .................. | B60W 50/02 |
| 2021/0092019 A1* | 3/2021 | Fang | ........................ | H04W 4/40 |
| 2021/0287459 A1* | 9/2021 | Cella | .................... | G07C 5/0808 |
| 2022/0046114 A1* | 2/2022 | Entelis | .................... | H04L 12/40 |
| 2024/0255958 A1* | 8/2024 | Cristache | ............. | G05D 1/6987 |

FOREIGN PATENT DOCUMENTS

| | | | | | |
|---|---|---|---|---|---|
| EP | 4412262 | A1 * | 8/2024 | .......... | B60W 50/045 |
| JP | 2019177807 | A | 10/2019 | | |
| JP | 2020013374 | A | 1/2020 | | |
| JP | 2020118516 | A * | 8/2020 | | |
| JP | 7064414 | B2 * | 5/2022 | ............. | G07C 5/008 |
| JP | 2022182015 | A * | 12/2022 | | |
| WO | WO-2016110915 | A1 * | 7/2016 | ............. | G07C 5/008 |
| WO | WO-2016116991 | A1 * | 7/2016 | ............. | G07C 5/008 |
| WO | WO-2019043446 | A1 * | 3/2019 | ........... | G05D 1/0287 |
| WO | WO-2021055955 | A1 * | 3/2021 | ............. | G07C 5/008 |
| WO | WO-2023013341 | A1 * | 2/2023 | ............ | B60W 40/08 |
| WO | WO-2024163397 | A1 * | 8/2024 | ............ | H04W 16/18 |

* cited by examiner

VEHICLE AND AUTONOMOUS DRIVING KIT

CROSS-REFERENCE TO RELATED APPLICATION

This application claims priority to Japanese Patent Application No. 2022-024594 filed on Feb. 21, 2022, incorporated herein by reference in its entirety.

BACKGROUND

1. Technical Field

The present disclosure relates to control of a vehicle that is capable of autonomous driving.

2. Description of Related Art

In recent years, development of an autonomous driving system that causes a vehicle to travel without needing user operation has been advanced. In some cases, an autonomous driving system is provided as an external device, which is separate from a vehicle, via an interface device, for example, in order to be able to be mounted in an existing vehicle. The external device enables autonomous driving, for example, by acquiring information on surroundings independently of the vehicle, and controlling each actuator and the like of the vehicle via the interface device by using the acquired information.

For example, Japanese Unexamined Patent Application Publication No. 2019-177807 discloses a technique in which at a vehicle that performs autonomous driving by using information from an external device, when there is lost part in the information from the external device, the lost part is complemented by using information stored in the vehicle.

SUMMARY

At a vehicle as described above, self-diagnosis of whether or not it is a timing to carry out maintenance, such as replacement or tune-up of a component, is performed by using a usage history of the vehicle. When it is the timing to carry out maintenance, a notification is sent to a user or a maintenance service station via a server or the like, and a reservation is made for maintenance to be carried out at the maintenance service station.

However, if the external device and the vehicle independently perform self-diagnosis of whether or not it is a timing to carry out maintenance, notification of a timing to carry out maintenance and entry of the vehicle into the maintenance service station can be frequent because, for example, it may be determined, immediately after maintenance of one of the external device and the vehicle is carried out, that it is a timing to carry out maintenance of the other.

The present disclosure has been made to solve the problem as described above, and an object thereof is to provide a vehicle and an autonomous driving kit that restrain maintenance from being frequently requested.

A vehicle according to an aspect of the present disclosure includes: an autonomous driving kit configured to enable autonomous driving of a vehicle, the autonomous driving kit being attachable to and removable from the vehicle; and a vehicle control system configured to be capable of performing control of the vehicle, according to an instruction from the autonomous driving kit. The autonomous driving kit is configured to be capable of performing first diagnosis processing of diagnosing whether or not a predetermined first component, among a plurality of components included in the autonomous driving kit, is in a state requiring maintenance. The vehicle control system is configured to be capable of performing second diagnosis processing of diagnosing whether or not a predetermined second component, among a plurality of components included in the vehicle except the autonomous driving kit, is in a state requiring maintenance. When any one diagnosis processing of the first diagnosis processing and the second diagnosis processing is performed, the other diagnosis processing is performed within a predetermined period after the one diagnosis processing is performed.

With the configuration thus made, the first diagnosis processing performed by the autonomous driving kit and the second diagnosis processing performed by the vehicle control system are performed within the predetermined period, whereby timings of carrying out maintenance can be restrained from being separated between the autonomous driving kit and others. Accordingly, entry of the vehicle into a maintenance service station can be restrained from being frequent.

In an embodiment, when a condition for performing any one diagnosis processing of the first diagnosis processing and the second diagnosis processing is met, the first diagnosis processing and the second diagnosis processing may be performed in parallel.

With the configuration thus made, the first diagnosis processing and the second diagnosis processing are performed in parallel, whereby timings of carrying out maintenance can be restrained from being separated between the autonomous driving kit and others. Accordingly, entry of the vehicle into the maintenance service station can be restrained from being frequent.

In another embodiment, the autonomous driving kit may transmit a predetermined signal to the vehicle control system when the autonomous driving kit performs the first diagnosis processing. The vehicle control system may perform the second diagnosis processing when the vehicle control system receives the predetermined signal.

With the configuration thus made, the vehicle control system performs the second diagnosis processing by receiving the predetermined signal from the autonomous driving kit, whereby the first diagnosis processing and the second diagnosis processing can be performed in parallel. Accordingly, it is possible to restrain the occurrence of a scenario in which timings of carrying out maintenance are separated between the autonomous driving kit and others, and consequently entry of the vehicle into the maintenance service station becomes frequent.

In still another embodiment, the vehicle control system may transmit a predetermined signal to the autonomous driving kit when the vehicle control system performs the second diagnosis processing. The autonomous driving kit may perform the first diagnosis processing when the autonomous driving kit receives the predetermined signal.

With the configuration thus made, the autonomous driving kit performs the first diagnosis processing by receiving the predetermined signal from the vehicle control system, whereby the first diagnosis processing and the second diagnosis processing can be performed in parallel. Accordingly, it is possible to restrain the occurrence of a scenario in which timings of carrying out maintenance are separated between the autonomous driving kit and others, and consequently entry of the vehicle into the maintenance service station becomes frequent.

In yet another embodiment, the vehicle control system may further include a communication device that is capable of communicating with a server provided outside of the vehicle. The communication device may transmit information on a result of diagnosis that necessitates maintenance to the server after the first diagnosis processing and the second diagnosis processing are finished.

With the configuration thus made, it is possible to restrain the occurrence of a scenario in which timings of carrying out maintenance are separated between the autonomous driving kit and others, and consequently entry of the vehicle into the maintenance service station becomes frequent.

In further another embodiment, the autonomous driving kit may further include a communication device that is capable of communicating with a server provided outside of the vehicle. The communication device may transmit information on a result of diagnosis that necessitates maintenance to the server after the first diagnosis processing and the second diagnosis processing are finished.

With the configuration thus made, it is possible to restrain the occurrence of a scenario in which timings of carrying out maintenance are separated between the autonomous driving kit and others, and consequently entry of the vehicle into the maintenance service station becomes frequent.

An autonomous driving kit according to another aspect of the present disclosure is an autonomous driving kit that is attachable to a vehicle and removable from the vehicle. The autonomous driving kit includes a computer configured to enable autonomous driving of the vehicle. The vehicle includes a vehicle control system configured to be capable of performing control of the vehicle, according to an instruction from the computer. The computer is configured to be capable of performing first diagnosis processing of diagnosing whether or not a predetermined first component, among a plurality of components included in the autonomous driving kit, is in a state requiring maintenance. The vehicle control system is configured to be capable of performing second diagnosis processing of diagnosing whether or not a predetermined second component, among a plurality of components included in the vehicle except the autonomous driving kit, is in a state requiring maintenance. When any one diagnosis processing of the first diagnosis processing and the second diagnosis processing is performed, the other diagnosis processing is performed within a predetermined period after the one diagnosis processing is performed.

According to the present disclosure, a vehicle and an autonomous driving kit that restrain maintenance from being frequently requested can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure is described in detail with reference to the drawings. Throughout the drawings, the same or equivalent portions are denoted by the same signs, and a description thereof is not repeated.

In the present disclosure, "maintenance" of an autonomous driving kit refers to allover action for maintaining the autonomous driving kit in a normal state, and for restoring the autonomous driving kit from an abnormal state to the normal state. The maintenance can include inspection, repair, tune-up, and replacement. The same applies to "maintenance" of a vehicle platform.

Figure 1:
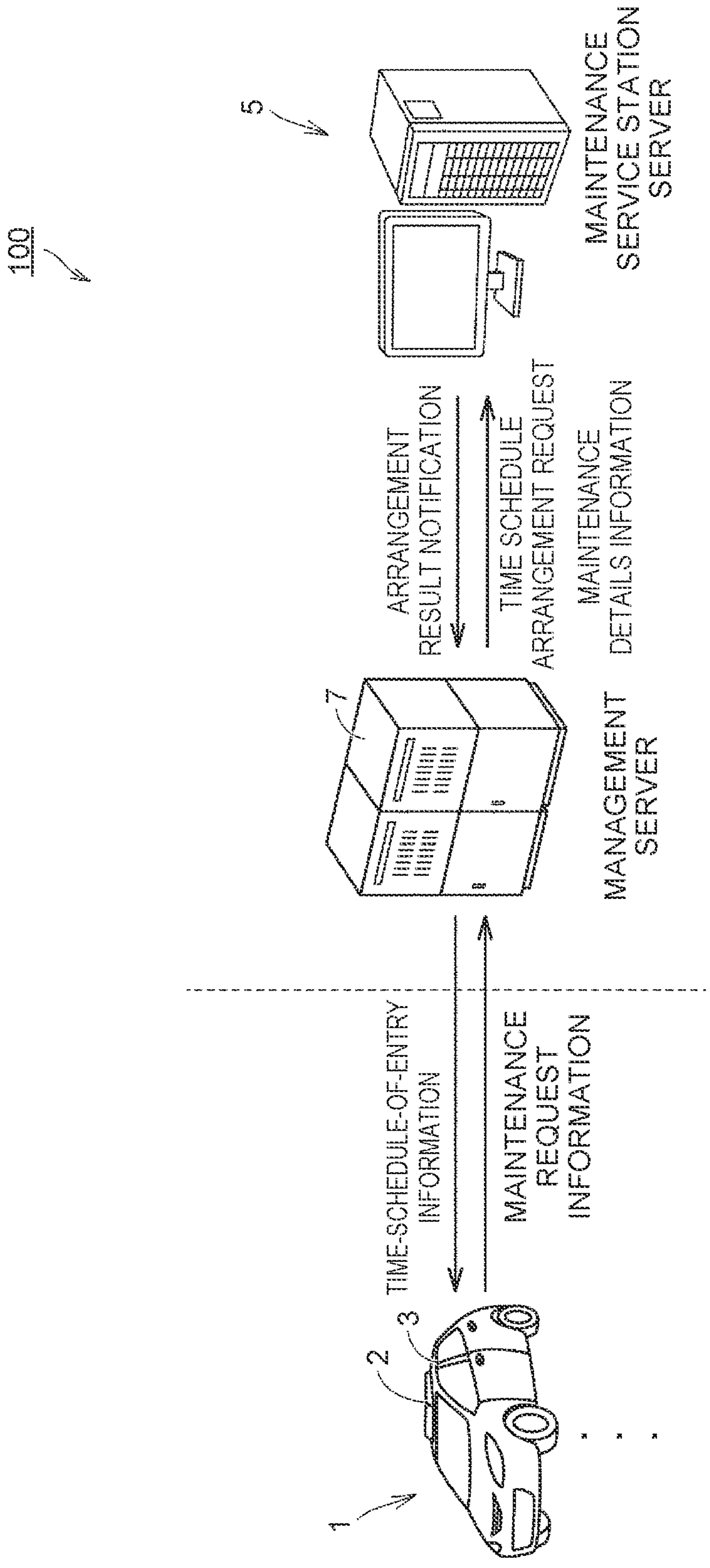
FIG. 1 schematically shows an entire configuration of an information processing system including vehicles according to an embodiment.

FIG. 1 schematically shows an entire configuration of an information processing system 100 including vehicles 1 according to the present embodiment. The information processing system 100 manages a plurality of vehicles. For convenience of description, a specific vehicle 1 is described below as an example, although many vehicles can be actually managed by the information processing system 100. The vehicle 1 includes an autonomous driving kit (ADK) 2 and a vehicle platform (VP) 3.

A user of the vehicle 1 is, typically, but is not limited to, an individual user. The user may be a business operator (taxi business operator, rental car business operator, car-sharing business operator, ride-sharing service provider, or the like) that provides an autonomous driving service using the vehicle 1.

The ADK 2 is configured to be attachable to and removable from the VP 3. For example, the ADK 2 is attached to a predetermined place, such as a rooftop of the VP 3.

The ADK 2 is configured to enable autonomous driving of the vehicle 1. Specifically, the ADK 2 creates a travel plan of the vehicle 1. The ADK 2 outputs to the VP 3 various control requests to cause the vehicle 1 to travel according to the travel plan, by following application program interfaces (APIs) that are defined for the control requests, respectively. Moreover, the ADK 2 receives from the VP 3 various signals indicating a vehicle state (a state of the VP 3), by following APIs that are defined for the signals, respectively. The ADK 2 reflects the vehicle state in the travel plan.

The VP 3 performs travel control in an autonomous driving mode, according to the control requests from the ADK 2. The VP 3 is configured to be able to perform travel control in a manual mode (travel control according to driver operation) when the ADK 2 is removed from the VP 3.

The VP 3 transmits various information (maintenance request information, which will be described later) to a management server 7 in the information processing system 100.

The information processing system 100 further includes a maintenance service station server 5 and the management server 7. The maintenance service station server 5 and the management server 7 are connected in such a manner as to be able to perform bidirectional communication via an undepicted network. Each of the maintenance service station server 5 and the management server 7 may be an own server of a business operator. Each server may be a shared server that is shared among a plurality of business operators including the business operator owning the server. Each server may be a cloud server provided by a cloud server management company.

The maintenance service station server 5 is a server run by a maintenance service station for the vehicle 1 (for example, a retailer, a dealer, or the like). The maintenance service station server 5 manages a maintenance schedule (a time schedule of entry, details of maintenance while in the station, and the like) of the vehicle 1. For example, the maintenance service station server 5 transmits data related to the maintenance schedule to the management server 7, or arranges the time schedule of entry, in response to a request from the management server 7.

The management server 7 is, for example, a server run by a business operator that performs maintenance management of a plurality of vehicles including the vehicle 1. For example, the business operator may be a manufacturer of the VP 3, or a manufacturer of the ADK 2. Moreover, the management server 7 may be configured to include a server run by the manufacturer of the VP 3 and a server that operates the ADK 2. In a description below, a case is described as an example where the management server 7 includes one server.

The management server 7 is configured to be able to receive information that requests maintenance (a request for maintenance) of the ADK 2 from the vehicle 1. The management server 7 includes a database (not shown) for storing a request for maintenance of the ADK 2 received from at least one of the plurality of vehicles 1, in such a format that can identify the request-source vehicle. The management server 7 transmits a request for maintenance of the ADK 2 to the maintenance service station server 5. Thus, in the maintenance service station server 5, a reservation for maintenance of the ADK 2 mounted on the request-source vehicle, and the like are made.

The management server 7 further receives a request for maintenance of the VP 3 from the vehicle 1. The management server 7 further includes a database (not shown) for storing a request for maintenance of the VP 3 received from at least one of the plurality of vehicles 1, in such a format that can identify the request-source vehicle. Note that the database of requests for maintenance of the VP 3 and the database of requests for maintenance of the ADK 2 may be a common database, or may be different databases. The management server 7 transmits a request for maintenance of the VP 3 to the maintenance service station server 5. Thus, in the maintenance service station server 5, a reservation for maintenance of the VP 3 of the request-source vehicle, and the like are made.

When the maintenance service station server 5 receives from the management server 7 the request for maintenance of the ADK 2 or the request for maintenance of the VP 3, the maintenance service station server 5 updates the maintenance schedule by setting a reservation for maintenance in a time window that is available for maintenance work, along with information that can identify the request-source vehicle (for example, a number shown on a license plate, a serial number, or the like). When the maintenance service station server 5 receives the request for maintenance of the ADK 2 or the request for maintenance of the VP 3, the maintenance service station server 5 may automatically set the reservation in a vacant time window, or may automatically set the reservation in a time window that satisfies time schedule conditions included in various requests for maintenance.

Figure 2:
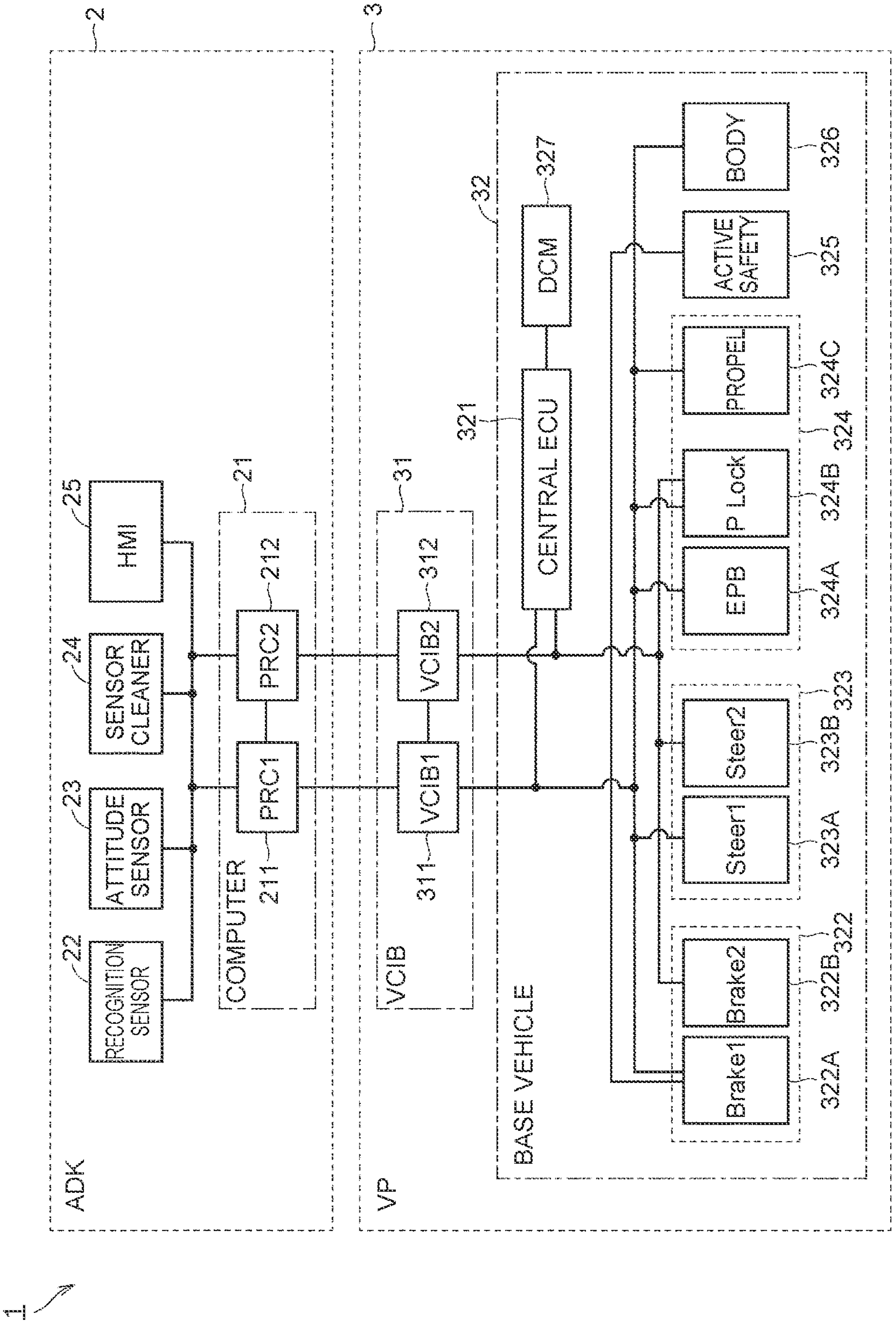
FIG. 2 shows configurations of an ADK and a VP in more detail.

FIG. 2 shows configurations of the ADK 2 and the VP 3 in more detail. The ADK 2 includes a computer 21, a recognition sensor 22, an attitude sensor 23, a sensor cleaner 24, and a human machine interface (HMI) 25.

The VP 3 includes a vehicle control interface box (VCIB) 31 and a base vehicle 32. The base vehicle 32 includes a central electronic control unit (ECU) 321, a braking system 322, a steering system 323, a power train system 324, an active safety system 325, a body system 326, and a digital communication system (DCM) 327.

The braking system 322 includes braking systems 322A, 322B. The steering system 323 includes steering systems 323A, 323B. The power train system 324 includes an electric parking brake (EPB) system 324A, a parking lock (P lock) system 324B, and a propelling system 324C.

The computer 21 is made redundant and includes two processors 211, 212 (corresponding to PRC1 and PRC2 in FIG. 2). The computer 21 (each processor 211, 212) acquires data related to an environment of the vehicle 1 by using the recognition sensor 22 during autonomous driving of the vehicle 1. Moreover, the computer 21 acquires data related to an attitude, behavior, and a position of the vehicle 1 by using the attitude sensor 23 during autonomous driving of the vehicle 1. Further, the computer 21 is communicably connected to the VCIB 31. The computer 21 acquires a vehicle state from the VP 3 via the VCIB 31 and sets a next action (accelerating, decelerating, turning, or the like) of the vehicle 1. The computer 21 outputs various instructions for realizing the next action to the VP 3 via the VCIB 31.

The recognition sensor 22 is a sensor for recognizing the environment of the vehicle 1. The recognition sensor 22 includes, for example, at least one of a laser imaging detection and ranging (LIDAR), a millimeter-wave radar, and a camera (none are shown). The LIDAR measures a distance and a direction of a target object, for example, by emitting infrared pulse laser light and detecting reflected light from the object targeted by the laser light. The millimeter-wave radar measures a distance and a direction of a target object by emitting millimeter-wave light and detecting reflected light from the object targeted by the millimeter-wave light. The camera captures an image around the vehicle 1.

The attitude sensor 23 is a sensor for detecting an attitude, behavior, and a position of the vehicle 1. The attitude sensor 23 includes, for example, an inertial measurement unit (IMU) and a global positioning system (GPS) (neither are shown). The IMU detects, for example, acceleration rates of the vehicle 1 in the vehicle front-rear direction, the vehicle right-left direction, and the vehicle-height direction, and angular rates of the vehicle 1 in the roll direction, the pitch direction, and the yaw direction. The GPS identifies a position of the vehicle 1 by using information received from a plurality of GPS satellites that move in orbit around the earth.

The sensor cleaner 24 is configured to remove, by using cleaning fluid, a wiper, or the like, dirt adhering to the various sensors (a lens of the camera, a laser light irradiating part, and the like) during travel of the vehicle 1. The HMI 25 is configured to be connected to, for example, an input-output device (not shown) such as a touch panel display provided to the base vehicle 32.

The VCIB 31 is communicably connected to the ADK 2 through a controller area network (CAN) or the like. The VCIB 31 receives various control requests from the ADK 2 and outputs a vehicle state to the ADK 2, by executing predetermined APIs, each of which is defined for each signal. When the VCIB 31 receives a control request from the ADK 2, the VCIB 31 outputs a control instruction corresponding to the control request to a system corresponding to the control instruction. Moreover, the VCIB 31 acquires various information related to a vehicle state (a state of the base vehicle 32) and outputs the acquired information to the ADK 2.

The VCIB 31 includes a VCIB 311 and a VCIB 312. The VCIB 311 and the VCIB 312 basically have equivalent functions. However, some of connection destinations of a bus to the systems of the base vehicle 32 are different between the VCIB 311 and the VCIB 312. Specifically, the VCIB 311 is communicably connected to the braking system 322A, the steering system 323A, the EPB system 324A, the P lock system 324B, the propelling system 324C, and the body system 326. The VCIB 312 is communicably connected to the braking system 322B, the steering system 323B, and the P lock system 324B.

The central ECU 321, via the DCM 327, transmits various information indicating a vehicle state to the management server 7, and transmits various requests to the management server 7. Moreover, the central ECU 321 receives an instruction or a notification from the management server 7 via the DCM 327. Further, the central ECU 321 performs diagnosis of whether or not the VP 3 is in a state requiring maintenance, by using a vehicle state acquired from each system of the VP 3, or receives a result of diagnosis obtained through self-diagnosis performed by each system of the VP 3 and performs diagnosis of whether or not the VP 3 is in a state requiring maintenance, by using the received results of diagnosis.

In the present embodiment, the central ECU 321 is described as an entity that performs diagnosis processing of diagnosing whether or not a state of the vehicle 1 requires maintenance. However, in addition to such a function, the central ECU 321 may include a function (gateway function) that performs relaying of a communication between various ECUs included in the individual systems, and the like.

Each of the braking systems 322A, 322B is configured to control a braking device (not shown) provided to each tire wheel of the base vehicle 32. The braking device includes, for example, a disc braking system that operates according to hydraulic pressure adjusted by an actuator. The braking system 322A generates a braking instruction to the braking device, according to a control request transmitted from the ADK 2 via the VCIB 311.

Each of the steering systems 323A, 323B is configured to control a steering angle of a steering wheel of the vehicle 1 by using a steering device (not shown). The steering device includes, for example, an electric power steering (EPS) that can adjust the steering angle by using an actuator. The steering system 323A generates a steering instruction to the steering device, according to a control request transmitted from the ADK 2 via the VCIB 311. The steering system 323B generates a steering instruction to the steering device, according to a control request transmitted from the ADK 2 via the VCIB 312.

The EPB system 324A controls an EPB (not shown) provided to at least one of a plurality of the tire wheels, according to a control request transmitted from the ADK 2 via the VCIB 311. For example, the EPB fixes the tire wheel by actuating a drum brake for a parking braking system.

The P lock system 324B controls a Plock device (not shown) provided to a transmission, according to a control request transmitted from the ADK 2 via the VCIB 311. The P lock device fixes rotation of an output shaft of the transmission by fitting a parking lock pole in a lock gear that is provided in a connected manner to a rotating element in the transmission. Thus, the tire wheel is fixed.

The propelling system 324C changes shift ranges of a shift device (not shown), according to a control request transmitted from the ADK 2 via the VCIB 311. Moreover, the propelling system 324C controls driving force from a drive source (undepicted motor generator, engine, or the like), according to a control request from the ADK 2.

The active safety system 325 detects an obstacle in front or behind by using undepicted sensors (camera, radar, sensor, and the like). The active safety system 325 determines whether or not it is probable that the vehicle 1 collides with the obstacle, based on the distance between the vehicle 1 and the obstacle, and a direction of movement of the vehicle 1. When it is determined that the collision is provable, the active safety system 325 outputs a braking instruction to the braking system 322A such that braking force increases.

The body system 326 is configured to control components such as a turn signal, a horn, and a wiper (none are shown), for example, according to a travel state or an environment of the vehicle 1, or the like. The body system 326 controls each of the components, according to a control request transmitted from the ADK 2 via the VCIB 31.

The DCM 327 is an in-vehicle communication module. The DCM 327 is configured to enable bidirectional data communication between the central ECU 321 and the management server 7.

At the vehicle 1 with the configuration as described above, diagnosis of whether or not a state requires maintenance of a component, such as inspection, repair, replacement, or tune-up thereof, is performed by using a usage history of the vehicle 1, and when the state requires maintenance, a request for maintenance of the vehicle 1 is transmitted to the management server 7.

When the management server 7 receives the request for maintenance from the vehicle 1, the management server 7 transmits information requesting arrangement of a time schedule of maintenance (time schedule arrangement request) and information on requested maintenance details (maintenance details information) to the maintenance service station server 5. Note that the management server 7 may have the time schedule arrangement request include information requesting that a reservation for the maintenance be made in a predetermined time window, by using a schedule of operation of the request-source vehicle 1, or the like.

The maintenance service station server 5 updates a maintenance schedule by setting a reservation for the maintenance in any one of available time windows by using the time schedule arrangement request and the maintenance details information from the management server 7. The maintenance service station server 5 transmits a notification of a result of time schedule arrangement to the management server 7. For example, the management server 7 transmits information on a schedule and a time window of entry (time-schedule-of-entry information) to the vehicle 1 that is the source of the request for maintenance. The vehicle 1 can receive maintenance by moving, through manual driving or autonomous driving, to the maintenance service station at the date and the time designated as the day of the entry.

Cases where diagnosis of whether or not a state requires maintenance is performed at the vehicle 1 include a case where a period of usage of a diagnosis-target component since a time point of previous replacement exceeds a threshold value, a case where an amount of wear of a diagnosis-target component since a time point of previous replacement exceeds a threshold value, a case where an error code about a diagnosis-target component is output, and a case where an output value of a diagnosis-target component is abnormal.

For example, when a period of usage of various types of oil since a time point of previous replacement exceeds a threshold value, which is set depending on the type of each oil, it is diagnosed that the state requires maintenance for oil replacement. Alternatively, when an amount of wear of a brake pad exceeds a threshold value, it is diagnosed that the state requires maintenance for brake pad replacement. Alternatively, when a predetermined error code is output about, for example, equipment related to driving operation of the vehicle 1, such as an engine or a motor generator, it is diagnosed that the state requires maintenance for inspection. Alternatively, when an output value of any one of various sensors is output beyond a normal range, it is diagnosed that the state requires maintenance for sensor replacement, tune-up, or the like.

The determination is performed by using a result of diagnosis obtained through self-diagnosis processing that is performed at the vehicle 1. For example, the self-diagnosis processing is performed by the computer 21 of the ADK 2 or the central ECU 321 of the VP 3.

The computer 21 of the ADK 2 is configured to be capable of performing first diagnosis processing of diagnosing whether or not a predetermined component, of the plurality of components included in the ADK 2, requires maintenance. Examples of the predetermined component that can be a diagnosis target in the diagnosis processing performed by the computer 21 include the various sensors, such as the recognition sensor 22 and the attitude sensor 23, and the equipment, such as the sensor cleaner 24, included in the ADK 2.

Moreover, the central ECU 321 of the VP 3 is configured to be capable of performing second diagnosis processing of diagnosing whether or not a predetermined second component, of the plurality of components included in the VP 3, requires replacement. Examples of the predetermined component that can be a diagnosis target in the diagnosis processing performed by the central ECU 321 include the oil, the brake pad, the equipment related to driving operation of the vehicle 1, various sensors, and the like.

However, if diagnosis of whether or not a state requires maintenance is performed by the ADK 2 and the VP 3 independently, for example, it may be determined, immediately after maintenance of one of the ADK 2 and the VP 3 is performed, that it is a timing to carry out maintenance of the other, so that notification of a timing to carry out maintenance and entry of the vehicle into the maintenance service station can be frequent.

Accordingly, in the present embodiment, when any one diagnosis processing of the first diagnosis processing and the second diagnosis processing is performed, the other diagnosis processing is configured to be performed within a predetermined period after the one diagnosis processing is performed. For example, when a condition for performing diagnosis processing is met at any one of the ADK 2 and the VP 3, it is notified from the one to the other that diagnosis processing is performed, whereby diagnosis processing by the other can be performed within the predetermined period after the diagnosis processing by the one is performed. Note that the predetermined period is not particularly limited, and may be set, for example, such as to make a travel distance or a travel duration appropriate in a state where it is determined by the one diagnosis processing that the diagnosis-target component requires maintenance.

With the configuration thus made, timings of carrying out maintenance can be restrained from being separated between the ADK 2 and the VP 3. Accordingly, entry of the vehicle into the maintenance service station can be restrained from being frequent.

Figure 3:
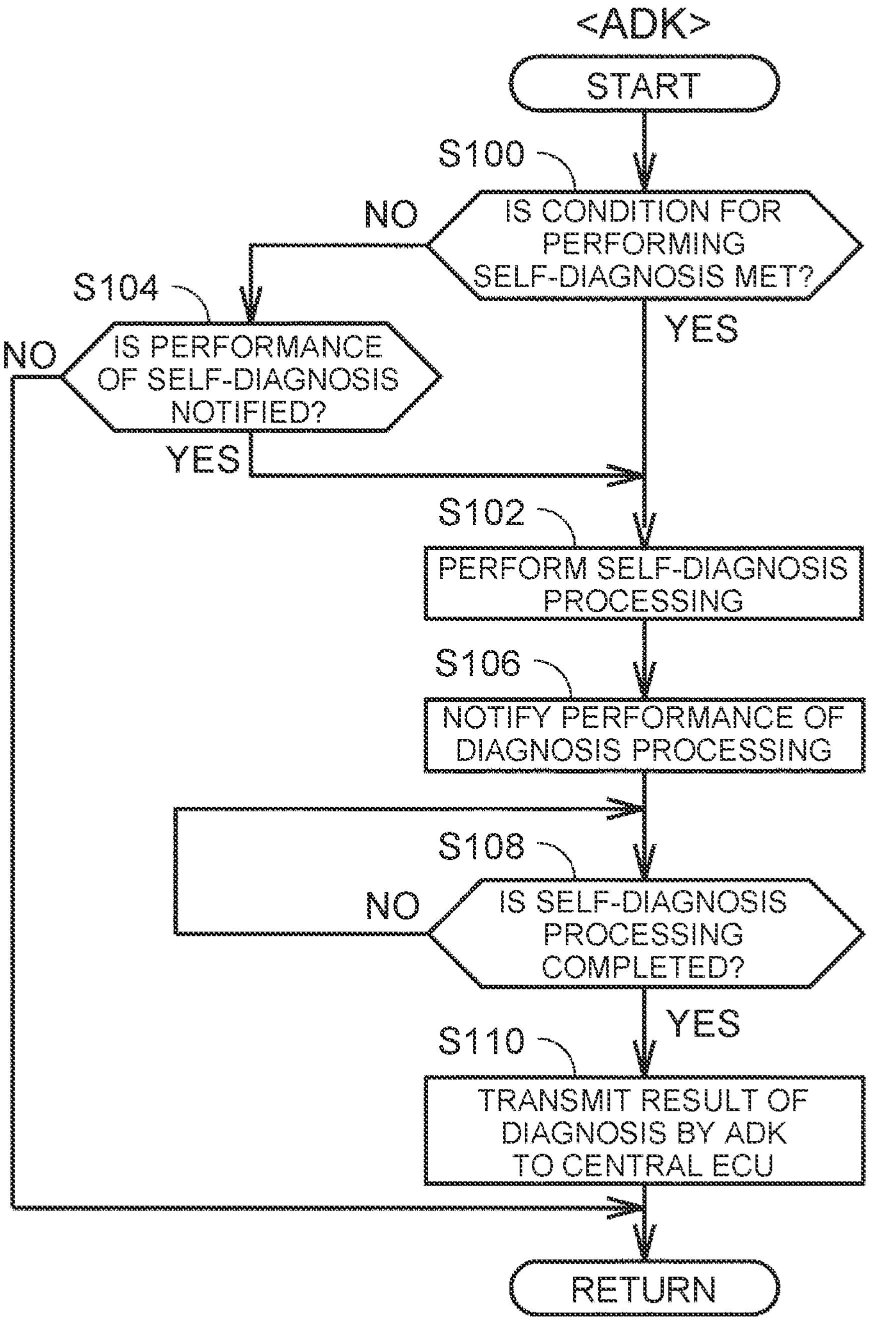
FIG. 3 is a flowchart showing an example of processing performed by a computer of the ADK.

Hereinafter, an example of processing performed by the computer 21 of the ADK 2 is described with reference to FIG. 3. FIG. 3 is a flowchart showing the example of the processing performed by the computer 21 of the ADK 2. A series of the processing shown in the flowchart is performed by the computer 21 repeatedly for each predetermined control period.

In step (hereinafter, step is abbreviated as S) 100, the computer 21 determines whether or not a condition for performing self-diagnosis processing is met. The condition for performing self-diagnosis processing by the ADK 2 includes, for example, a condition that the vehicle 1 be under driverless autonomous driving, and a condition that a predetermined first time period have passed since a time point at which previous self-diagnosis processing was performed. For example, the computer 21 may determine that the vehicle 1 is under driverless autonomous driving, by receiving predetermined information from the VP 3, or may determine whether or not the vehicle 1 is traveling, by using the recognition sensor 22 or the attitude sensor 23, while determining whether or not the VP 3 is driverless, by receiving, from the VP 3, information acquired by using equipment such as a seat sensor or a camera in the vehicle cabin (neither is shown). The first time period is preset, for example, based on a rate of deterioration or the like of a diagnosis-target component of the ADK 2. When it is determined that the condition for performing self-diagnosis processing is met (YES in S100), the processing moves to S102.

In S102, the computer 21 performs self-diagnosis processing by the ADK 2. For example, the computer 21 diagnoses whether or not the diagnosis-target component is in a state requiring maintenance. Since a diagnosis target and a diagnosis method at the ADK 2 are as described above, a detailed description thereof is not repeated. When a result of diagnosis is obtained, the computer 21 stores information on the result of diagnosis in a predetermined area of a memory (not shown). Thereafter, the processing moves to S106. Note that when it is determined that the condition for performing self-diagnosis is not met (NO in S100), the processing moves to S104.

In S104, the computer 21 determines whether or not performance of self-diagnosis processing is notified from the VP 3. For example, when information (a predetermined signal) indicating that self-diagnosis processing is performed by the VP 3 is received from the central ECU 321 of the VP 3, the computer 21 may determine that performance of self-diagnosis processing is notified from the VP 3. When it is determined that performance of self-diagnosis processing is notified (YES in S104), the processing moves to S102.

In S106, the computer 21 notifies the performance of the diagnosis processing to the VP 3. Specifically, the computer 21 transmits, to the central ECU 321, information (a predetermined signal) indicating that the self-diagnosis processing is performed by the ADK 2. Thereafter, the processing moves to S108.

In S108, the computer 21 determines whether or not the self-diagnosis processing is completed. For example, the computer 21 may determine whether or not the self-diagnosis processing is completed, based on a state of a flag, which is set in an on state when self-diagnosis processing is completed, or may determine that the self-diagnosis processing is completed when a result of diagnosis is stored in the predetermined area of the memory. When it is determined that the self-diagnosis processing is completed (YES in S108), the processing moves to S110. Note that when it is determined that the self-diagnosis processing is not completed (NO in S108), the processing returns to S108.

In S110, the computer 21 transmits the result of diagnosis obtained through the self-diagnosis processing by the ADK 2 to the central ECU 321. Note that when it is determined that performance of self-diagnosis processing is not notified (NO in S104), the processing is terminated.

Figure 4:
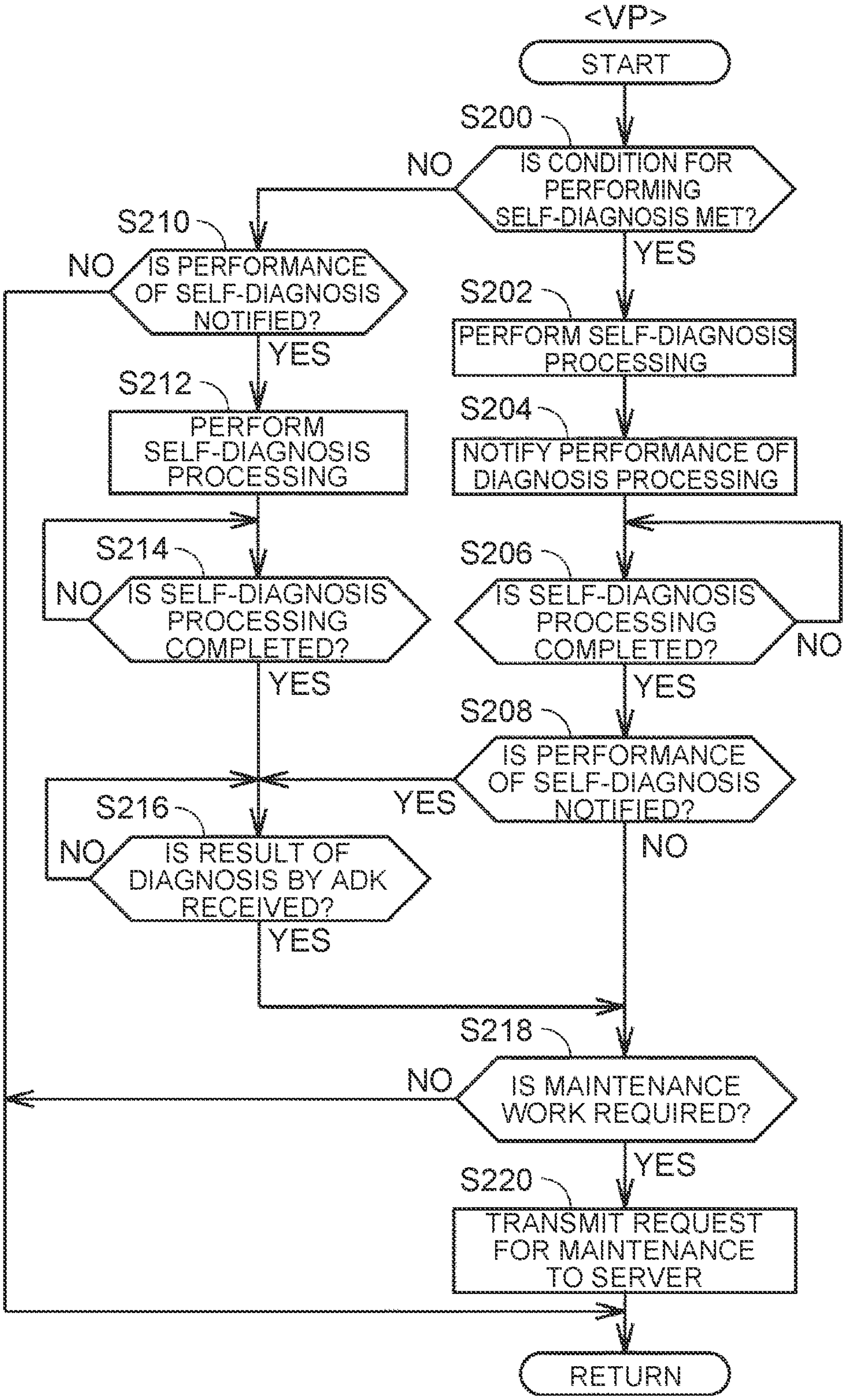
FIG. 4 is a flowchart showing an example of processing performed by a central ECU of the VP.

Next, an example of processing performed by the central ECU 321 of the VP 3 is described with reference to FIG. 4. FIG. 4 is a flowchart showing the example of the processing performed by the central ECU 321. A series of the processing shown in the flowchart is performed by the central ECU 321 repeatedly for each predetermined control period.

In S200, the central ECU 321 determines whether or not a condition for performing self-diagnosis processing is met. The condition for performing self-diagnosis processing by the VP 3 includes, for example, a condition that the vehicle 1 be under driverless autonomous driving, and a condition that a predetermined second time period have passed since a time point at which previous self-diagnosis was performed. For example, the central ECU 321 may determine whether or not the vehicle 1 is traveling, by receiving, from the ADK 2, information acquired by using the recognition sensor 22 or the attitude sensor 23, while determining whether or not the VP 3 is driverless, by using information that is acquired by using equipment such as the seat sensor or the camera in the vehicle cabin. The second time period is predetermined, for example, based on a rate of deterioration or the like of a diagnosis-target component of the VP 3. When it is determined that the condition for performing self-diagnosis processing is met (YES in S202), the processing moves to S202.

In S202, the central ECU 321 performs self-diagnosis processing by the VP 3. For example, the central ECU 321 diagnoses whether or not the diagnosis-target component is in a state requiring maintenance. Since a diagnosis target and a diagnosis method at the VP 3 are as described above, a detailed description thereof is not repeated. When a result of diagnosis is obtained, the central ECU 321 stores information on the result of diagnosis in a predetermined area of a memory (not shown). Thereafter, the processing moves to S204.

In S204, the central ECU 321 notifies the performance of the diagnosis processing to the ADK 2. Specifically, the central ECU 321 transmits, to the ADK 2, information (a predetermined signal) indicating that the self-diagnosis processing by the VP 3 is performed. Thereafter, the processing moves to S206.

In S206, the central ECU 321 determines whether or not the self-diagnosis processing is completed. For example, the central ECU 321 may determine whether or not the self-diagnosis processing is completed, based on a state of a flag, which is set in an on state when self-diagnosis processing by the VP 3 is completed, or may determine that the self-diagnosis processing is completed when a result of diagnosis is stored in the predetermined area of the memory. When it is determined that the self-diagnosis processing by the VP 3 is completed (YES in S206), the processing moves to S208. Note that when it is determined that the self-diagnosis processing is not completed (NO in S206), the processing returns to S206.

In S208, the central ECU 321 determines whether or not performance of self-diagnosis processing is notified from the computer 21 of the ADK 2. For example, when information (a predetermined signal) indicating that self-diagnosis processing is performed by the ADK 2 is received from the computer 21, the central ECU 321 may determine that performance of self-diagnosis processing is notified from the ADK 2. When it is determined that performance of self-diagnosis processing is notified from the ADK 2 (YES in S208), the processing moves to S216. Note that when it is determined that the condition for performing self-diagnosis processing is not met (NO in S200), the processing moves to S210.

In S210, the central ECU 321 determines whether or not performance of self-diagnosis processing is notified from the ADK 2. A determination method is similar to the determination method in the process in S208. Accordingly, a detailed description of the determination method is not repeated. When it is determined that performance of self-diagnosis processing is notified from the ADK 2 (YES in S210), the processing moves to S212.

In S212, the central ECU 321 performs self-diagnosis processing by the VP 3. Since the self-diagnosis processing is similar to the process in S202, a detailed description thereof is not repeated. Thereafter, the processing moves to S214.

In S214, the central ECU 321 determines whether or not the self-diagnosis processing is completed. Since a determination method is similar to the determination method in the process in S206, a detailed description thereof is not repeated. When it is determined that the self-diagnosis processing by the VP 3 is completed (YES in S214), the processing moves to S216. Note that when it is determined that the self-diagnosis processing by the VP 3 is not completed (NO in S214), the processing returns to S214.

In S216, the central ECU 321 determines whether or not a result of diagnosis obtained through the self-diagnosis processing by the ADK 2 is received from the ADK 2. For example, when a result of diagnosis is received from the ADK 2, the central ECU 321 stores information indicating the result of diagnosis in a predetermined area of the memory. Accordingly, for example, the central ECU 321 may determine that a result of diagnosis is received from the ADK 2 when information indicating the result of diagnosis is stored in the predetermined area of the memory. When it is determined that a result of diagnosis obtained through the self-diagnosis processing by the ADK 2 is received (YES in S216), the processing moves to S218. Note that when it is determined that a result of diagnosis is not received (NO in S216), the processing returns to S216.

In S218, the central ECU 321 determines whether or not maintenance work is required. Specifically, the central ECU 321 determines that maintenance work is required when information indicating the result of diagnosis obtained through the self-diagnosis processing by the ADK 2 includes a request for maintenance of the ADK 2 (that is, when replacement, repair, inspection, or tune-up of the diagnosis-target component is requested). Alternatively, the central ECU 321 determines that maintenance work is required when the result of diagnosis obtained through the self-diagnosis processing by the VP 3 includes a request for maintenance of the VP 3. When it is determined that maintenance work is required (YES in S218), the processing moves to S220.

In S220, the central ECU 321 transmits a request for maintenance to the management server 7 by using the DCM 327. The central ECU 321 transmits a request for maintenance of the ADK 2 to the management server 7 when the result of diagnosis obtained through the self-diagnosis processing by the ADK 2 includes a request for maintenance of the ADK 2. The central ECU 321 transmits a request for maintenance of the VP 3 to the management server 7 when the result of diagnosis obtained through the self-diagnosis processing by the VP 3 includes a request for maintenance of the VP 3.

Note that the processing is terminated when the condition for performing self-diagnosis processing by the VP 3 is not met (NO in S200) and when it is determined that performance of self-diagnosis processing by the ADK 2 is not notified (NO in S210), or when it is determined that maintenance work is not required (NO in S218).

A description is given of an example of operation of the ADK 2 and the VP 3 based on the configuration and the flowcharts as described above.

When Condition for Performing Self-diagnosis Processing Is Met Only at ADK 2

For example, during driverless autonomous driving, when it is determined that the first time period has passed since a time point at which previous self-diagnosis processing by the ADK 2 was performed, it is determined that the condition for performing self-diagnosis processing is met at the ADK 2 (YES in S100), self-diagnosis processing by the ADK 2 is performed (S102), and the performance of the self-diagnosis processing is notified to the VP 3 (S106). Then, the self-diagnosis processing is completed (YES in S108), and a result of diagnosis obtained through the self-diagnosis processing by the ADK 2 is transmitted to the central ECU 321 (S110).

At the VP 3, when it is determined that performance of self-diagnosis processing is notified from the ADK 2 (YES in S210), even if the condition for performing self-diagnosis processing by the VP 3 is not met (NO in S200), self-diagnosis processing by the VP 3 is performed (S212). Accordingly, the self-diagnosis processing by the ADK 2 and the self-diagnosis processing by the VP 3 are performed within a predetermined period.

When the self-diagnosis processing is completed (YES in S214), and the result of diagnosis by the ADK 2 is received (YES in S216), it is determined whether or not maintenance work is required for at least one of the ADK 2 and the VP 3 (S218). When it is determined that maintenance work is required for at least one of the ADK 2 and the VP 3 (YES in S218), a request for maintenance of the at least one of the ADK 2 and the VP 3 for which it is determined that maintenance work is required is transmitted to the management server 7 (S220).

When the management server 7 receives the request for maintenance of the ADK 2 or the VP 3, a time schedule arrangement request and maintenance details information are transmitted to the maintenance service station server 5. The maintenance service station server 5 reserves any one time window of available time windows and transmits the reserved time window, as an arrangement result notification, to the management server 7. The management server 7 transmits the reserved time window, as time-schedule-of-entry information, to the vehicle 1 that is the source of the request for maintenance. Thus, the vehicle 1 can receive maintenance at the maintenance service station in the reserved time window.

When Condition for Performing Self-diagnosis Processing Is Met Only at VP 3

For example, during driverless autonomous driving, when it is determined that the second time period has passed since a time point at which previous self-diagnosis processing by the VP 3 was performed, it is determined that the condition for performing self-diagnosis processing is met at the VP 3 (YES in S200), self-diagnosis processing is performed (S202), and the performance of the self-diagnosis processing is notified to the ADK 2 (S204). When the self-diagnosis processing is completed (YES in S206), and when a notification of performance of self-diagnosis processing by the ADK 2 is received from the ADK 2 (YES in S208), it is determined whether or not a result of diagnosis by the ADK 2 is received (S216).

When a result of diagnosis by the ADK 2 is received (YES in S216), it is determined whether or not maintenance work is required for at least one of the ADK 2 and the VP 3 (S218). When it is determined that maintenance work is required for at least one of the ADK 2 and the VP 3 (YES in S218), a request for maintenance of the at least one of the ADK 2 and the VP 3 for which it is determined that maintenance work is required is transmitted to the management server 7 (S220).

As described above, according to the vehicle 1 in the present embodiment, when the condition for performing diagnosis processing is met at any one of the ADK 2 and the VP 3, performance of diagnosis processing is notified from the one to the other, whereby the other can perform diagnosis processing within a predetermined period after the one performs diagnosis processing. In other words, self-diagnosis processing by the ADK 2 and self-diagnosis processing by the VP 3 are performed in parallel, whereby timings of carrying out maintenance can be restrained from being separated between the ADK 2 and the VP 3. Accordingly, entry of the vehicle into the maintenance service station can be restrained from being frequent. Thus, the vehicle and the autonomous driving kit that restrain maintenance from being frequently requested can be provided.

Hereinafter, modifications are described.

In the embodiment, a case is described as an example where self-diagnosis processing by the VP 3 is performed by the central ECU 321. However, an entity that performs self-diagnosis processing by the VP 3 is not limited to the central ECU 321, and self-diagnosis processing by the VP 3 may be performed by any ECU of the systems.

Moreover, in the embodiment, it is described that the central ECU 321 performs self-diagnosis processing by the VP 3 when performance of self-diagnosis processing is notified from the ADK 2. However, as to a timing of performance, self-diagnosis processing by the VP 3 may be performed within a predetermined period after self-diagnosis processing by the ADK 2 is performed.

Further, in the embodiment, it is described that a result of diagnosis obtained through self-diagnosis processing performed by the ADK 2 is transmitted to the VP 3, and a request for maintenance of the VP 3 or a request for maintenance of the ADK 2 is transmitted to the management server 7 by using the DCM 327, which is a communication device of the VP 3. However, for example, when a communication module is included in the ADK 2, a request for maintenance of the VP 3 or a request for maintenance of the ADK 2 may be transmitted to the management server 7 by using the communication module included in the ADK 2.

Figure 5:
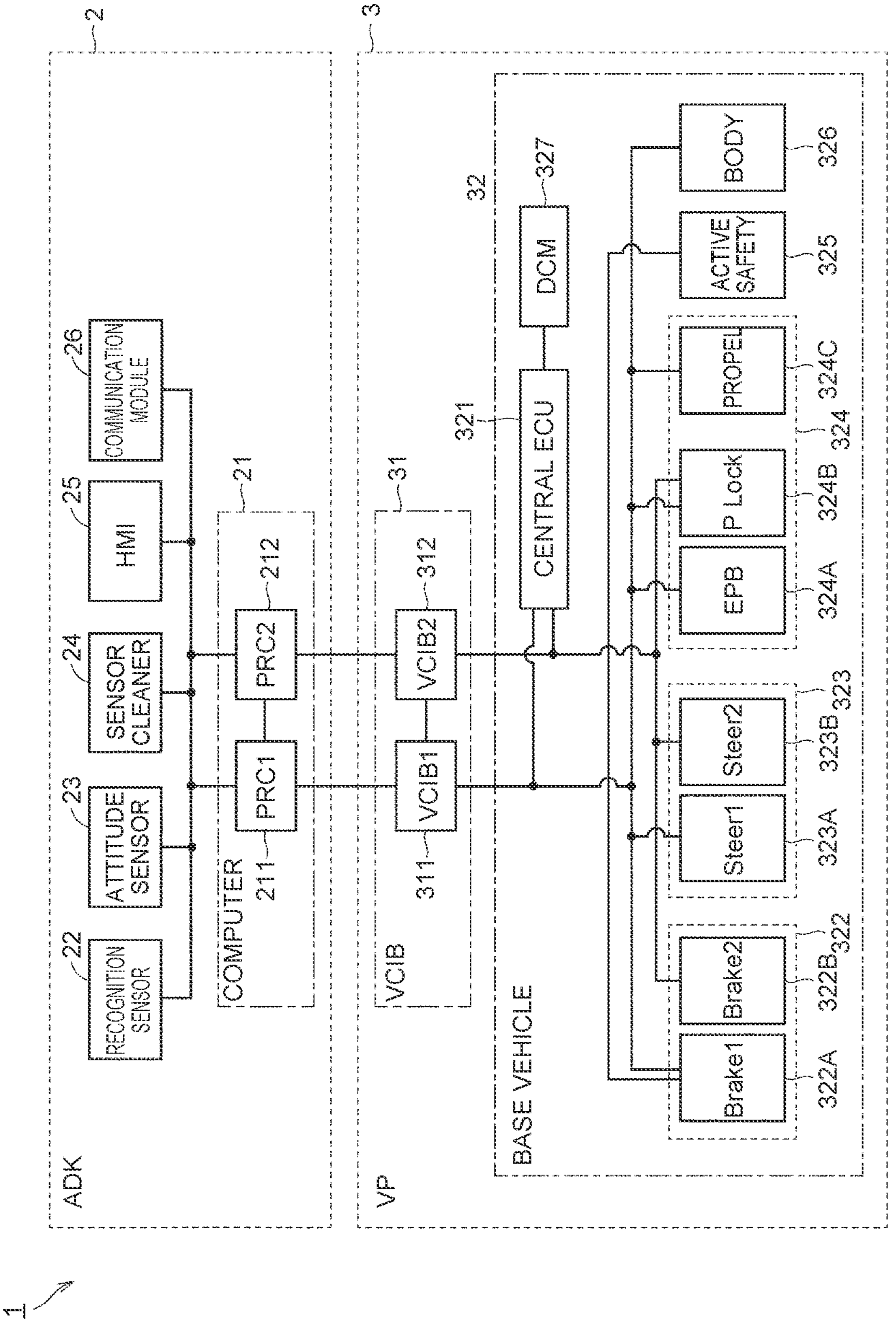
FIG. 5 shows configurations of an ADK and a VP in a modification in more detail.

FIG. 5 shows configurations of an ADK 2 and a VP 3 in a modification in more detail. A vehicle 1 shown in FIG. 5 is different from the vehicle 1 shown in FIG. 2 in a point that the ADK 2 further includes a communication module 26. Since the other components are similar to the components of the vehicle 1 shown in FIG. 2, a detailed description thereof is not repeated.

The communication module 26 is configured to enable bidirectional data communication between the computer 21 and the management server 7.

Figure 6:
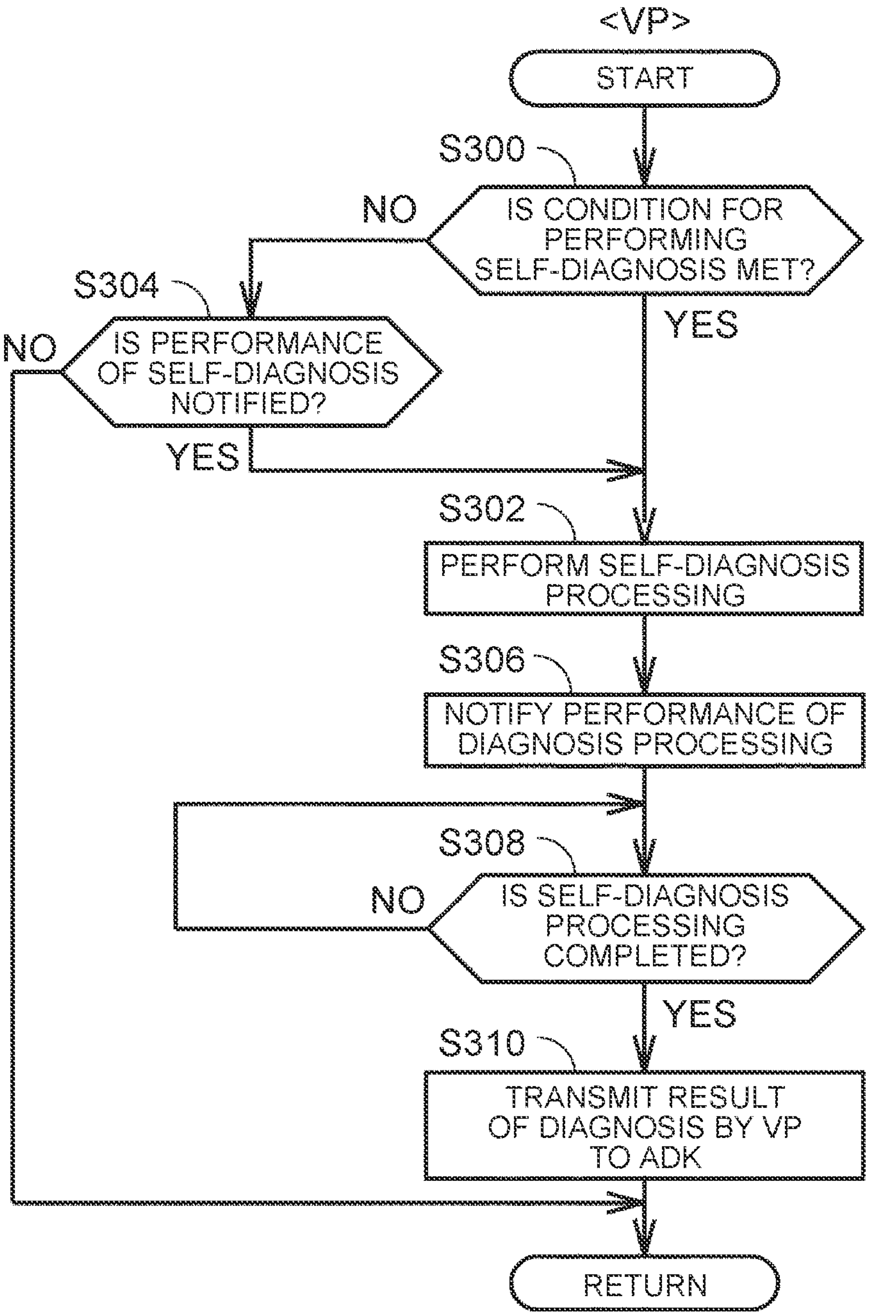
FIG. 6 is a flowchart showing an example of processing performed by the central ECU in the modification.

Hereinafter, an example of processing performed by the central ECU 321 of the VP 3 in the present modification is described with reference to FIG. 6. FIG. 6 is a flowchart showing the example of the processing performed by the central ECU 321 in the modification. A series of the processing shown in the flowchart is performed by the central ECU 321 repeatedly for each predetermined control period.

In S300, the central ECU 321 determines whether or not a condition for performing self-diagnosis processing is met. The condition for performing self-diagnosis processing by the VP 3 is similar to the condition for performing self-diagnosis processing in the process in S200 in the flowchart shown in FIG. 4. Accordingly, a detailed description of the condition for performing self-diagnosis processing by the VP 3 is not repeated. When it is determined that the condition for performing self-diagnosis processing is met (YES in S300), the processing moves to S302.

In S302, the central ECU 321 performs self-diagnosis processing by the VP 3. The self-diagnosis processing by the VP 3 is similar to the self-diagnosis processing in the process in S202 in the flowchart shown in FIG. 4. Accordingly, a detailed description of the self-diagnosis processing by the VP 3 is not repeated. Thereafter, the processing moves to S306. Note that when it is determined that the condition for performing self-diagnosis processing is not met (NO in S300), the processing moves to S304.

In S304, it is determined whether or not a notification of performance of self-diagnosis processing is received from the ADK 2. When it is determined that a notification of performance of self-diagnosis processing is received from the ADK 2 (YES in S304), the processing moves to S302.

In S306, the central ECU 321 notifies the performance of the self-diagnosis processing by the VP 3 to the ADK 2. Thereafter, the processing moves to S308.

In S308, the central ECU 321 determines whether or not the self-diagnosis processing by the VP 3 is completed. A determination method for determining that the self-diagnosis processing by the VP 3 is completed is similar to the determination method for determining that the self-diagnosis processing is completed, used in S206 in the flowchart shown in FIG. 4. Accordingly, a detailed description of the determination method is not repeated. When it is determined that the self-diagnosis processing is completed (YES in S308), the processing moves to S310. Note that when it is determined that the self-diagnosis processing is not completed (NO in S308), the processing returns to S308.

In S310, the central ECU 321 transmits a result of diagnosis obtained through the self-diagnosis processing by the VP 3 to the ADK 2. Note that when it is determined that a notification of performance of self-diagnosis processing is not received (NO in S304), the processing is terminated.

Figure 7:
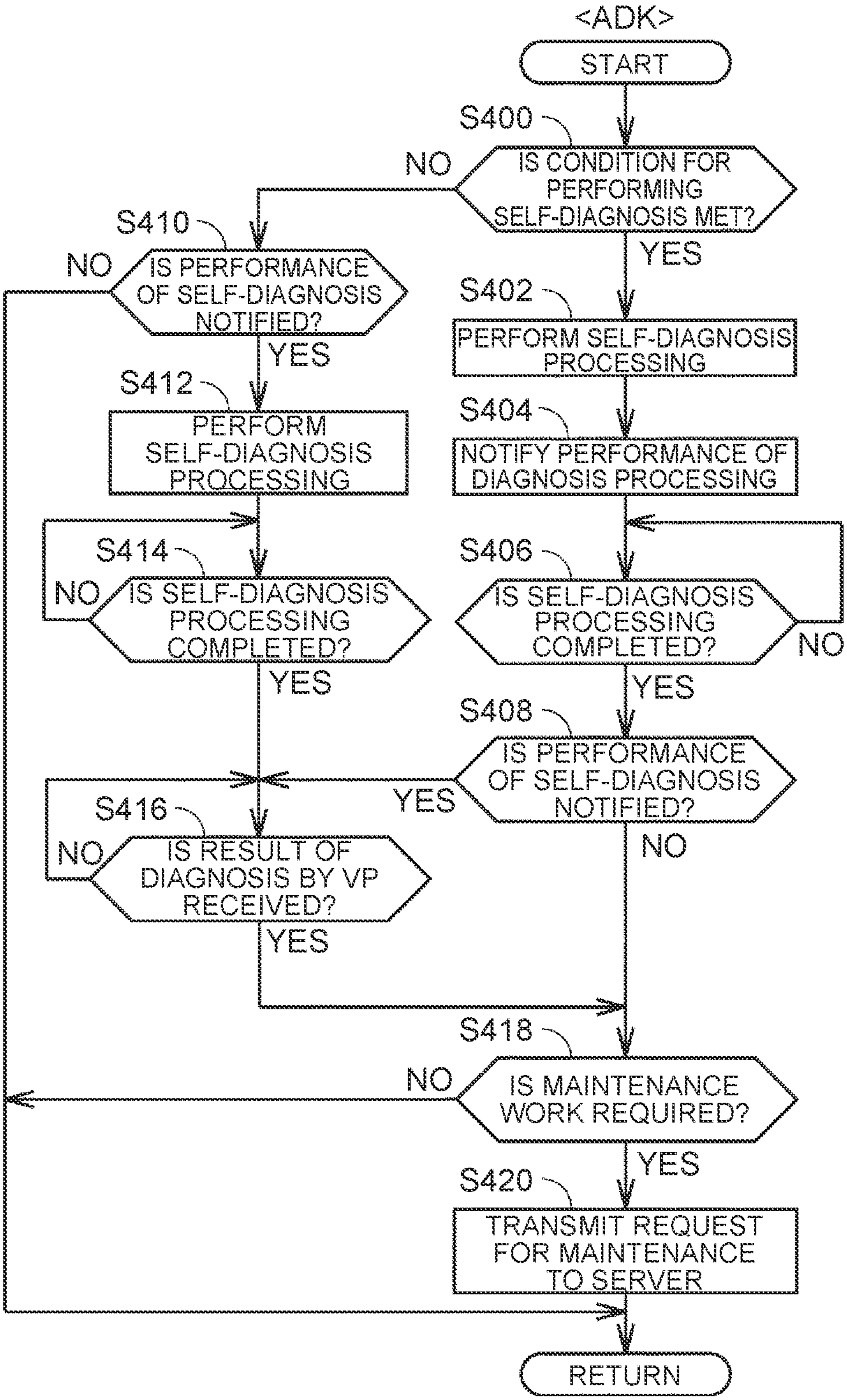
FIG. 7 is a flowchart showing an example of processing performed by the computer in the modification.

Next, an example of processing performed by the computer 21 of the ADK 2 in the present modification is described with reference to FIG. 7. FIG. 7 is a flowchart showing the example of the processing performed by the computer 21 in the modification. A series of the processing shown in the flowchart is performed by the computer 21 repeatedly for each predetermined control period.

In S400, the computer 21 determines whether or not a condition for performing self-diagnosis processing by the ADK 2 is met. The condition for performing self-diagnosis processing by the ADK 2 is similar to the condition for performing self-diagnosis processing in the process in S100 in the flowchart shown in FIG. 3. Accordingly, a detailed description of the condition for performing self-diagnosis processing by the ADK 2 is not repeated. When it is determined that the condition for performing self-diagnosis processing by the ADK 2 is met (YES in S400), the processing moves to S402.

In S402, the computer 21 performs self-diagnosis processing by the ADK 2. The self-diagnosis processing by the ADK 2 is similar to the self-diagnosis processing in S102 in the flowchart shown in FIG. 3. Accordingly, a detailed description of the self-diagnosis processing by the ADK 2 is not repeated. Thereafter, the processing moves to S404.

In S404, the computer 21 notifies the performance of the self-diagnosis processing by the ADK 2 to the VP 3. Thereafter, the processing moves to S406.

In S406, the computer 21 determines whether or not the self-diagnosis processing by the ADK 2 is completed. A determination method for determining that the self-diagnosis processing by the ADK 2 is completed is similar to the determination method for determining that the self-diagnosis processing is completed, used in the process in S108 in the flowchart shown in FIG. 3. Accordingly, a detailed description of the determination method is not repeated. When it is determined that the self-diagnosis processing is completed (YES in S406), the processing moves to S408. Note that when it is determined that the self-diagnosis processing is not completed (NO in S406), the processing returns to S406.

In S408, the computer 21 determines whether or not performance of self-diagnosis processing is notified from the VP 3. For example, the computer 21 may determine that performance of self-diagnosis processing is notified from the VP 3 when information (a predetermined signal) indicating that self-diagnosis processing is performed by the VP 3 is received from the central ECU 321. When it is determined that performance of self-diagnosis processing is notified from the VP 3 (YES in S408), the processing moves to S416. Note that when it is determined that the condition for performing self-diagnosis processing is not met (NO in S400), the processing moves to S410.

In S410, the computer 21 determines whether or not performance of self-diagnosis processing is notified from the VP 3. A determination method is similar to the determination method in the process in S408. Accordingly, a detailed description of the determination method is not repeated. When it is determined that performance of self-diagnosis processing is notified from the VP 3 (YES in S410), the processing moves to S412.

In S412, the computer 21 performs self-diagnosis processing by the ADK 2. Thereafter, the processing moves to S414.

In S414, the computer 21 determines whether or not the self-diagnosis processing by the ADK 2 is completed. When it is determined that the self-diagnosis processing by the ADK 2 is completed (YES in S414), the processing moves to S416. Note that when it is determined that the self-diagnosis processing is not completed (NO in S414), the processing returns to S414.

In S416, the computer 21 determines whether or not a result of diagnosis obtained through the self-diagnosis processing by the VP 3 is received from the VP 3. For example, when the computer 21 receives a result of diagnosis from the VP 3, the computer 21 stores information indicating the result of diagnosis in a predetermined area of the memory. Accordingly, for example, the computer 21 may determine that a result of diagnosis is received from the VP 3 when information indicating the result of diagnosis is stored in the predetermined area of the memory. When it is determined that a result of diagnosis obtained through the self-diagnosis processing by the VP 3 is received (YES in S416), the processing moves to S418. Note that when it is determined that a result of diagnosis is not received (NO in S416), the processing returns to S416.

In S418, the computer 21 determines whether or not maintenance work is required. Specifically, the computer 21 determines that maintenance work is required when information indicating the result of diagnosis obtained through the self-diagnosis processing by the VP 3 includes a request for maintenance of the VP 3. Alternatively, the computer 21 determines that maintenance work is required when a result of diagnosis obtained through the self-diagnosis processing by the ADK 2 includes a request for maintenance of the ADK 2. When it is determined that maintenance work is required (YES in S418), the processing moves to S420.

In S420, the computer 21 transmits a request for maintenance to the management server 7 by using the communication module 26. The computer 21 transmits a request for maintenance of the VP 3 to the management server 7 when the result of diagnosis obtained through the self-diagnosis processing by the VP 3 includes a request for maintenance of the VP 3. The computer 21 transmits a request for maintenance of the ADK 2 to the management server 7 when the result of diagnosis obtained through the self-diagnosis processing by the ADK 2 includes a request for maintenance of the ADK 2.

Note that the processing is terminated when the condition for performing self-diagnosis processing by the ADK 2 is not met (NO in S400) and when it is determined that performance of self-diagnosis processing by the VP 3 is not notified (NO in S410), or when it is determined that maintenance work it not required (NO in S418).

A description is given of an example of operation of the ADK 2 and the VP 3 in the present modification based on the configuration and the flowcharts as described above.

When Condition for Performing Self-diagnosis Processing Is Met Only at VP 3

For example, during driverless autonomous driving, when it is determined that the second time period has passed since a time point at which previous self-diagnosis processing by the VP 3 was performed, it is determined that the condition for performing self-diagnosis processing is met at the VP 3 (YES in S300), self-diagnosis processing by the VP 3 is performed (S302), and the performance of the self-diagnosis processing is notified to the ADK 2 (S306). Then, when the self-diagnosis processing is completed (YES in S308), a result of diagnosis obtained through the self-diagnosis processing by the VP 3 is transmitted to the ADK 2 (S310).

At the ADK 2, when it is determined that performance of self-diagnosis processing is notified from the VP 3 (YES in S410), even if the condition for performing self-diagnosis processing by the ADK 2 is not met (NO in S400), self-diagnosis processing by the ADK 2 is performed (S412). Accordingly, the self-diagnosis processing by the ADK 2 and the self-diagnosis processing by the VP 3 are performed within a predetermined period.

When it is determined that the self-diagnosis processing is completed (YES in S414), and the result of diagnosis by the VP 3 is received (YES in S416), it is determined whether or not maintenance work is required for at least one of the ADK 2 and the VP 3 (S418). When it is determined that maintenance work is required for at least one of the ADK 2 and the VP 3 (YES in S418), a request for maintenance of the at least one of the ADK 2 and the VP 3 for which it is determined that maintenance work is required is transmitted to the management server 7 (S420).

When Condition for Performing Self-diagnosis Processing Is Met Only at ADK 2

For example, during driverless autonomous driving, when it is determined that the first time period has passed since a time point at which previous self-diagnosis processing by the ADK 2 was performed, it is determined that the condition for performing self-diagnosis processing is met at the ADK 2 (YES in S400), self-diagnosis processing by the ADK 2 is performed (S402), and the performance of the self-diagnosis processing is notified to the VP 3 (S404). Then, when the self-diagnosis processing is completed (YES in S406), and when a notification of performance of self-diagnosis processing by the VP 3 is received from the VP 3 (YES in S408), it is determined whether or not a result of diagnosis by the VP 3 is received (S416).

When a result of diagnosis by the VP 3 is received (YES in S416), it is determined whether or not maintenance work is required for at least one of the ADK 2 and the VP 3 (S418). When it is determined that maintenance work is required for at least one of the ADK 2 and the VP 3 (YES in S418), a request for maintenance of the at least one of the ADK 2 and the VP 3 for which it is determined that maintenance work is required is transmitted to the management server 7 (S420).

Also with the configuration thus made, when the condition for performing diagnosis processing is met at any one of the ADK 2 and the VP 3, performance of diagnosis processing is notified from the one to the other, whereby the other can perform diagnosis processing within a predetermined period after the one performs diagnosis processing. In other words, self-diagnosis processing by the ADK 2 and self-diagnosis processing by the VP 3 are performed in parallel, whereby timings of carrying out maintenance can be restrained from being separated between the ADK 2 and the VP 3. Accordingly, entry of the vehicle into the maintenance service station can be restrained from being frequent.

In the embodiment, it is described that a result of self-diagnosis processing performed by the ADK 2 is transmitted to the VP 3, and a request for maintenance of the VP 3 or a request for maintenance of the ADK 2 is transmitted to the management server 7 by using the DCM 327, which is a communication device of the VP 3. However, maintenance of the ADK 2 and maintenance of the VP 3 may be performed in parallel, with at least respective dates and time windows of entry for maintenance being arranged on the same date and in the same time window, and a request for maintenance may be made to the management server 7 by each of the ADK 2 and the VP 3 individually.

A configuration of a vehicle 1 in such a modification is identical to the configuration of the vehicle 1 shown in FIG. 5. Accordingly, a detailed description of the configuration of the vehicle 1 is not repeated.

Figure 8:
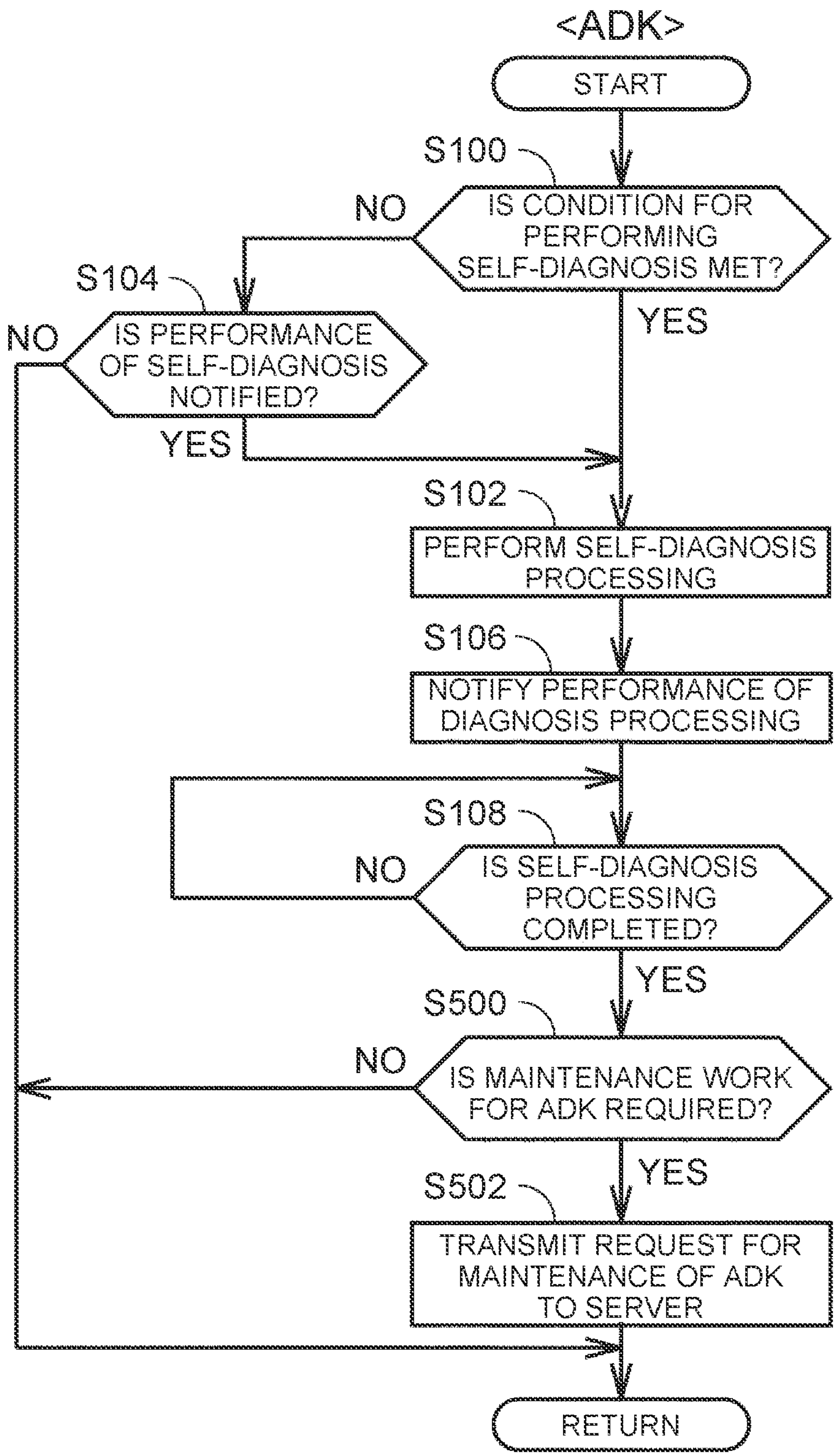
FIG. 8 is a flowchart showing another example of the processing performed by the computer in a modification.

Hereinafter, another example of the processing performed by the computer 21 of the ADK 2 in the present modification is described with reference to FIG. 8. FIG. 8 is a flowchart showing the other example of the processing performed by the computer 21 in the modification.

The flowchart shown in FIG. 8 is different from the flowchart shown in FIG. 3 in a point that a process in S500 and a process in S502 are included in place of the process in S110. Accordingly, processes in S100, S102, S104, S106, and S108 shown in the flowchart in FIG. 8 and the processes in S100, S102, S104, S106, and S108 shown in the flowchart in FIG. 3 are identical in content unless otherwise described in the following, and are denoted by the same step numbers, respectively. Accordingly, a detailed description of the processes is not repeated.

In S108, when it is determined that the self-diagnosis processing by the ADK 2 is completed (YES in S108), the processing moves to S500.

In S500, the computer 21 determines whether or not maintenance work for the ADK 2 is required. For example, the computer 21 determines that maintenance work for the ADK 2 is required when a result of diagnosis obtained through the self-diagnosis processing includes information that requests maintenance work for the ADK 2. When it is determined that maintenance work for the ADK 2 is required (YES in S500), the processing moves to S502.

In S502, the computer 21 transmits a request for maintenance of the ADK 2 to the management server 7 by using the communication module 26. Note that when it is determined that maintenance work for the ADK 2 is not required (NO in S500), the processing is terminated.

Figure 9:
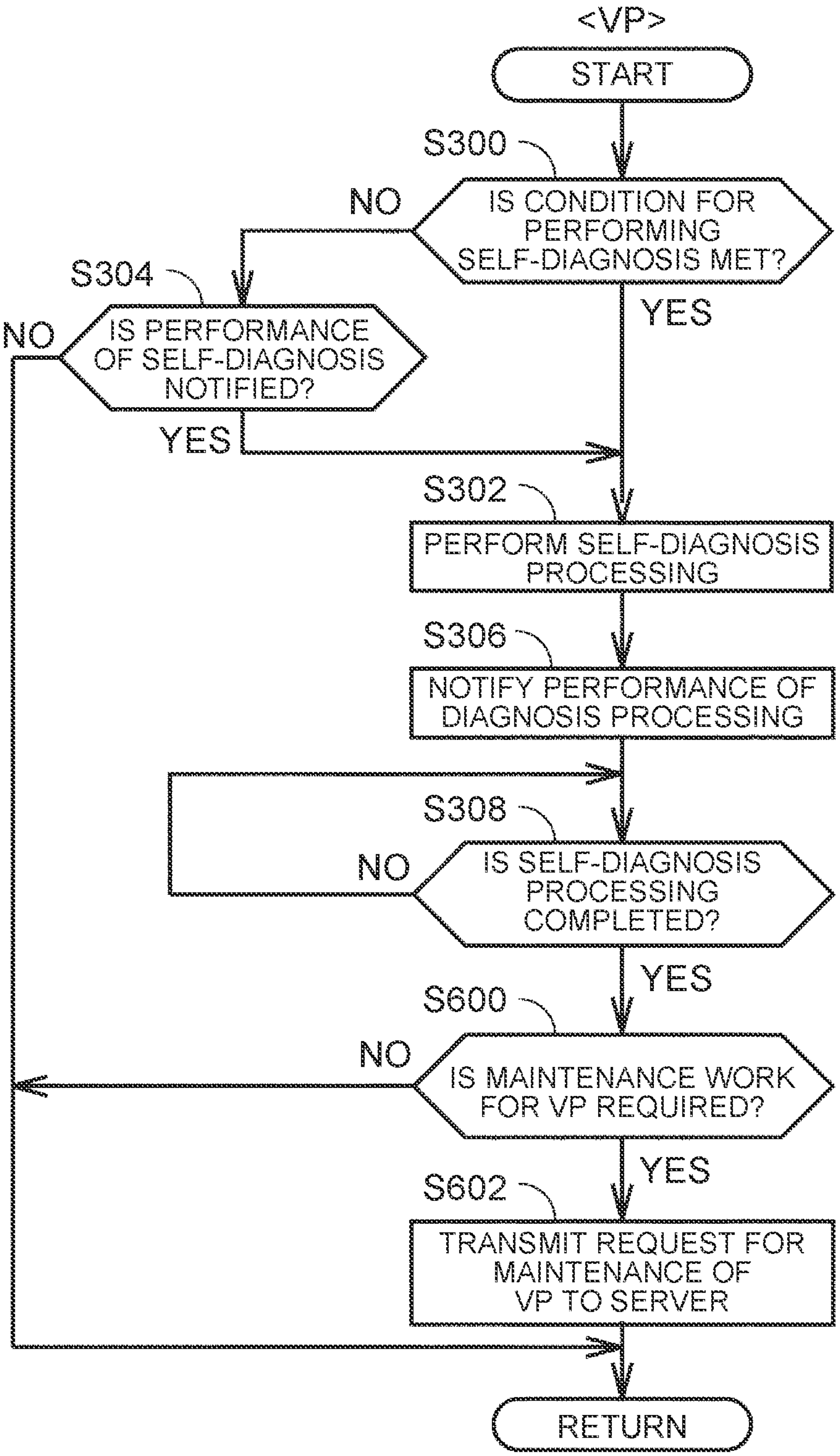
FIG. 9 is a flowchart showing another example of the processing performed by the central ECU in the modification.

Next, another example of the processing performed by the central ECU 321 of the VP 3 in the present modification is described with reference to FIG. 9. FIG. 9 is a flowchart showing the other example of the processing performed by the central ECU 321 in the modification.

The flowchart shown in FIG. 9 is different from the flowchart shown in FIG. 6 in a point that a process in S600 and a process in S602 are included in place of the process in S310. Accordingly, processes in S300, S302, S304, S306, and S308 shown in the flowchart in FIG. 9 and the processes in S300, S302, S304, S306, and S308 shown in the flowchart in FIG. 6 are identical in content unless otherwise described in the following, and are denoted by the same step numbers, respectively. Accordingly, a detailed description of the processes is not described.

In S308, when it is determined that the self-diagnosis processing by the VP 3 is completed (YES in S308), the processing moves to S600.

In S600, the central ECU 321 determines whether or not maintenance work for the VP 3 is required. For example, the central ECU 321 determines that maintenance work for the VP 3 is required when a result of diagnosis obtained through the self-diagnosis processing includes information that requests maintenance work for the VP 3. When it is determined that maintenance work for the VP 3 is required (YES in S600), the processing moves to S602.

In S602, the central ECU 321 transmits a request for maintenance of the VP 3 to the management server 7 by using the DCM 327. Note that when it is determined that maintenance work for the VP 3 is not required (NO in S600), the processing is terminated.

A description is given of another example of the operation of the ADK 2 and the VP 3 in the present modification based on the configuration and the flowcharts as described above.

For example, during driverless autonomous driving, when it is determined that the first time period has passed since a time point at which previous self-diagnosis processing by the ADK 2 was performed, it is determined that the condition for performing self-diagnosis processing is met at the ADK 2 (YES in S100), self-diagnosis processing by the ADK 2 is performed (S102), and the performance of the self-diagnosis processing is notified to the VP 3 (S106). Then, when the self-diagnosis processing is completed (YES in S108), and when it is determined, by using a result of diagnosis obtained through the self-diagnosis processing by the ADK 2, that maintenance work for the ADK 2 is required (YES in S500), a request for maintenance of the ADK 2 is transmitted to the management server 7 by using the communication module 26.

At the VP 3, when it is determined that performance of self-diagnosis processing is notified from the ADK 2 (YES in S304), even if the condition for performing self-diagnosis processing by the VP 3 is not met (NO in S300), self-diagnosis processing by the VP 3 is performed (S302). Accordingly, the self-diagnosis processing by the ADK 2 and the self-diagnosis processing by the VP 3 are performed within a predetermined period. Note that the predetermined period is, for example, a period in which a date and a time window of entry set due to the request for maintenance from the ADK 2 can be the same as a date and a time window of entry set due to the request for maintenance from the VP 3.

Then, the performance of the self-diagnosis processing is notified to the ADK 2 (S306), the self-diagnosis processing is completed (YES in S308), and when it is determined, by using a result of diagnosis obtained through the self-diagnosis processing by the VP 3, that maintenance work for the VP 3 is required (YES in S600), a request for maintenance of the VP 3 is transmitted to the management server 7 by using the DCM 327 (S602).

Note that even if the condition for performing self-diagnosis processing is met only at the VP 3, self-diagnosis processing is also performed by the ADK 2 due to the notification, from the VP 3 to the ADK 2, of the performance of the self-diagnosis processing, so that the self-diagnosis processing by the ADK 2 and the self-diagnosis processing by the VP 3 are performed within the predetermined period.

Also with the configuration thus made, when the condition for performing diagnosis processing is met at any one of the ADK 2 and the VP 3, performance of diagnosis processing is notified from the one to the other, whereby the other can perform diagnosis processing within the predetermined period after the one performs diagnosis processing. In other words, self-diagnosis processing by the ADK 2 and self-diagnosis processing by the VP 3 are performed in parallel, whereby timings of carrying out maintenance can be restrained from being separated between the ADK 2 and the VP 3. Accordingly, entry of the vehicle into the maintenance service station can be restrained from being frequent.

In the modification, it is described that the ADK 2 and the VP 3 respectively transmit a request for maintenance of the ADK 2 and a request for maintenance of the VP 3 to the management server 7. However, for example, when the management server 7 includes a first management server run by a manufacturer of the ADK 2 or the like and a second management server run by a manufacturer of the VP 3 or the like, the ADK 2 may transmit a request for maintenance of the ADK 2 to the first management server, and the VP 3 may transmit a request for maintenance of the VP 3 to the second management server. Also with such a configuration, entry of the vehicle into the maintenance service station can be restrained from being frequent by arranging for self-diagnosis processing by the ADK 2 and self-diagnosis processing by the VP 3 to be performed within a predetermined period. As to the predetermined period in such a case, for example, when the first management server and the second management server individually transmit time schedule arrangement requests to the maintenance service station server 5 in response to the requests for maintenance, the predetermined period is determined such that the same dates and time windows of entry are set in response to the respective requests for maintenance.

Note that the whole or part of each of the modifications may be combined as appropriate and embodied.

The disclosed embodiments, in all respects, shall be construed as illustrative and not as restrictive. The scope of the disclosure is defined not by the description but by claims, and is intended to include equivalent meanings to the claims and all modifications made within the scope.

What is claimed is:

1. A vehicle comprising:

an autonomous driving kit configured to enable autonomous driving of a vehicle, the autonomous driving kit being attachable to and removable from the vehicle, the autonomous driving kit comprising a plurality of sensors; and a vehicle control system configured to be capable of performing control of the vehicle, according to an instruction from the autonomous driving kit, the vehicle control system comprising an electronic control unit, wherein:

the autonomous driving kit is configured to be capable of performing first diagnosis processing of diagnosing whether or not a predetermined first component, among a plurality of components included in the autonomous driving kit, is in a state requiring maintenance by using a usage history of the vehicle, the vehicle control system is configured to be capable of performing second diagnosis processing of diagnosing whether or not a predetermined second component, among a plurality of components included in the vehicle except the autonomous driving kit, is in a state requiring maintenance, when any one diagnosis processing of the first diagnosis processing and the second diagnosis processing is performed, the other diagnosis processing is performed within a predetermined period after the one diagnosis processing is performed, the autonomous driving kit is configured to determine whether or not a self-diagnosis processing condition is met based on whether the vehicle is under driverless autonomous driving or a predetermined time period has lapsed since a previous self-diagnosis processing was performed, and the predetermined time period is preset and based on a rate of deterioration of the predetermined first component, and the autonomous driving kit or the vehicle control system is configured to determine whether or not self-diagnosis processing is completed based on a state of a flag that is set in an on state or when a result of the self-diagnosis processing is stored in a predetermined area of a memory.

2. The vehicle according to claim 1, wherein when a condition for performing any one diagnosis processing of the first diagnosis processing and the second diagnosis processing is met, the first diagnosis processing and the second diagnosis processing are performed in parallel.

3. The vehicle according to claim 1, wherein:

the autonomous driving kit transmits a predetermined signal to the vehicle control system when the autonomous driving kit performs the first diagnosis processing; and the vehicle control system performs the second diagnosis processing when the vehicle control system receives the predetermined signal.

4. The vehicle according to claim 1, wherein:

the vehicle control system transmits a predetermined signal to the autonomous driving kit when the vehicle control system performs the second diagnosis processing; and the autonomous driving kit performs the first diagnosis processing when the autonomous driving kit receives the predetermined signal.

5. The vehicle according to claim 1, wherein:

the vehicle control system further includes a communication device that is capable of communicating with a server provided outside of the vehicle; and the communication device transmits information on a result of diagnosis that necessitates maintenance to the server after the first diagnosis processing and the second diagnosis processing are finished.

6. The vehicle according to claim 1, wherein:

the autonomous driving kit further includes a communication device that is capable of communicating with a server provided outside of the vehicle; and the communication device transmits information on a result of diagnosis that necessitates maintenance to the server after the first diagnosis processing and the second diagnosis processing are finished.

7. An autonomous driving kit that is attachable to a vehicle and removable from the vehicle, the autonomous driving kit comprising:

a plurality of sensors; and a computer configured to enable autonomous driving of the vehicle, wherein the vehicle includes a vehicle control system configured to be capable of performing control of the vehicle, according to an instruction from the computer, the vehicle control system comprising an electronic control unit, the computer is configured to be capable of performing first diagnosis processing of diagnosing whether or not a predetermined first component, among a plurality of components included in the autonomous driving kit, is in a state requiring maintenance by using a usage history of the vehicle, the vehicle control system is configured to be capable of performing second diagnosis processing of diagnosing whether or not a predetermined second component, among a plurality of components included in the vehicle except the autonomous driving kit, is in a state requiring maintenance, when any one diagnosis processing of the first diagnosis processing and the second diagnosis processing is performed, the other diagnosis processing is performed within a predetermined period after the one diagnosis processing is performed, the computer is configured to determine whether or not a self-diagnosis processing condition is met based on whether the vehicle is under driverless autonomous driving or a predetermined time period has lapsed since a previous self-diagnosis processing was performed, and the predetermined time period is preset and based on a rate of deterioration of the predetermined first component, and the computer or the vehicle control system is configured to determine whether or not self-diagnosis processing is completed based on a state of a flag that is set in an on state or when a result of the self-diagnosis processing is stored in a predetermined area of a memory.

* * * * *